United States Patent
Ash et al.

(10) Patent No.: US 8,423,739 B2
(45) Date of Patent: Apr. 16, 2013

(54) APPARATUS, SYSTEM, AND METHOD FOR RELOCATING LOGICAL ARRAY HOT SPOTS

(75) Inventors: Kevin John Ash, Tucson, AZ (US);
Benjamin Jay Donie, Tucson, AZ (US);
Andreas Bernardus Mattias Koster, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 12/027,152

(22) Filed: Feb. 6, 2008

(65) Prior Publication Data

US 2009/0198940 A1 Aug. 6, 2009

(51) Int. Cl.
*G06F 12/00* (2006.01)

(52) U.S. Cl.
USPC .............................. 711/165; 711/5; 711/170

(58) Field of Classification Search .................. 711/170, 711/5, 165
See application file for complete search history.

(56) References Cited

U.S. PATENT DOCUMENTS

| | | | |
|---|---|---|---|
| 5,873,116 A | 2/1999 | Van Fleet | |
| 5,937,428 A * | 8/1999 | Jantz | 711/114 |
| 6,311,257 B1 * | 10/2001 | Fitzgerald et al. | 711/170 |
| 6,507,893 B2 | 1/2003 | Dawkins et al. | 711/133 |
| 6,961,727 B2 | 11/2005 | McBrearty et al. | 707/10 |
| 7,120,729 B2 * | 10/2006 | Gonzalez et al. | 711/103 |
| 7,185,163 B1 * | 2/2007 | Knight et al. | 711/165 |
| 7,277,982 B2 * | 10/2007 | Calvignac et al. | 711/105 |
| 7,398,302 B2 | 7/2008 | Yamagami et al. | |
| 7,530,073 B1 | 5/2009 | Shutt et al. | |
| 7,774,572 B2 | 8/2010 | Yokohata et al. | |
| 7,788,233 B1 * | 8/2010 | Iyer et al. | 707/661 |
| 7,818,499 B2 | 10/2010 | Arakawa et al. | |
| 7,913,055 B2 | 3/2011 | Karamcheti et al. | |
| 7,984,259 B1 | 7/2011 | English | |
| 2002/0133681 A1 | 9/2002 | McBrearty et al. | |
| 2002/0144057 A1 | 10/2002 | Li et al. | |
| 2003/0115434 A1 | 6/2003 | Mahalingam et al. | |
| 2004/0215713 A1 | 10/2004 | Bish et al. | 709/203 |
| 2004/0243692 A1 | 12/2004 | Arnold et al. | 709/220 |
| 2005/0268160 A1 * | 12/2005 | Taylor et al. | 714/6 |
| 2006/0069867 A1 * | 3/2006 | Arndt et al. | 711/114 |
| 2006/0143419 A1 | 6/2006 | Tulyani | |
| 2006/0161678 A1 | 7/2006 | Bopardikar et al. | 709/238 |

(Continued)

OTHER PUBLICATIONS

"Integrated Disk Management to Provide High Performance Logical Drives for Multiple Accesses and Large Sequential Accesses to a Multi-Disk Storage Subsystem", TBD v36 n6A, pp. 553-556.

(Continued)

*Primary Examiner* — Jared Rutz
*Assistant Examiner* — Gurtej Bansal
(74) *Attorney, Agent, or Firm* — Kunzler Law Group, PC (57) ABSTRACT

An apparatus, system, and method are disclosed for relocating logical array hot spots. An organization module organizes a plurality of logical arrays. Each logical array comprises a plurality of logical segments from a plurality of storage devices and configured to store data. An identification module identifies a hot spot on a first logical array if accesses to the first logical array exceed an access threshold. A migration module dynamically migrates a first logical segment from the first logical array to a second logical segment of a second logical array, wherein the migration is transparent to a host and data of the first logical segment is continuously available to the host.

20 Claims, 7 Drawing Sheets

U.S. PATENT DOCUMENTS

| | | | |
|---|---|---|---|
| 2006/0206603 | A1 | 9/2006 | Rajan et al. ............... 709/223 |
| 2007/0118710 | A1 | 5/2007 | Yamakawa et al. |
| 2007/0130423 | A1 | 6/2007 | Liu et al. |
| 2007/0150687 | A1* | 6/2007 | Chen et al. ............... 711/168 |
| 2007/0150774 | A1 | 6/2007 | Seng et al. |
| 2007/0260834 | A1 | 11/2007 | Kavuri et al. |
| 2008/0059718 | A1 | 3/2008 | Tajima et al. |
| 2009/0006734 | A1 | 1/2009 | Kishi et al. |
| 2009/0172255 | A1 | 7/2009 | Yeh et al. |
| 2009/0193174 | A1* | 7/2009 | Reid ............... 711/100 |
| 2009/0216910 | A1 | 8/2009 | Duchesneau |
| 2009/0240898 | A1 | 9/2009 | Abe et al. |
| 2009/0248979 | A1 | 10/2009 | Kobayashi et al. |
| 2009/0300277 | A1 | 12/2009 | Jeddeloh |
| 2010/0115175 | A9 | 5/2010 | Zhuang et al. |

OTHER PUBLICATIONS

U.S. Appl. No. 12/027,140, Office Action from USPTO, Jun. 25, 2010.

Jitu J. Makwana et al., "A Nonvolatile Memory Overview", http://aplawrence.com/Makwana/nonvolmem.html. Oct. 2004.

U.S. Appl. No. 12/027,140 Office Action dated Mar. 16, 2012.

Vijay Sundaram et al., "Efficient Data Migration in Self-Managing Storage Systems", Autonomic Computing, 2006, ICAC '06, IEEE International Conference on Jun. 13-16, pp. 297-300.

"Integrated Disk Management to Provide High Performance Logical Drives for Multiple Accesses and Large Sequential Accesses to a Multi-Disk Storage Subsystem", TBD v36 n6A, pp. 553-556, dated Jun. 1, 1993.

U.S. Appl. No. 12/027,140 Office Action dated Oct. 5, 2012.

* cited by examiner

APPARATUS, SYSTEM, AND METHOD FOR RELOCATING LOGICAL ARRAY HOT SPOTS

REFERENCE TO CO-PENDING APPLICATIONS

Reference is hereby made to a co-pending U.S. patent application Ser. No. 12/027,140, entitled "APPARATUS, SYSTEM, AND METHOD FOR RELOCATING STORAGE POOL HOT SPOTS," by Kevin John Ash on Feb. 6, 2006.

BACKGROUND OF THE INVENTION

1. Field of the Invention

This invention relates to hot spots in logical arrays and more particularly relates to relocating hot spots.

2. Description of the Related Art

Storage systems often store large amounts of data across a plurality of storage devices. For example, an enterprise data processing system may store data such as transaction data, customer accounts, customer accessible product information, and the like on hard disk drives.

The capacity of the storage devices may be divided into logical segments. The logical segments may be organized into one or more logical arrays. A logical array may also be referred to as a rank.

Some logical arrays may be accessed much more frequently than other logical arrays. For example, a logical array storage device storing customer transaction data may be accessed much more often than a storage device storing personnel files. As a result, the latency of a heavy accessed storage device may degrade, while the latency of a lightly accessed storage device may remain acceptable.

Heavily accessed areas of a storage device are referred to herein as hot spots. Hot spots may not always be apparent because of the organization of the storage devices as logical arrays and logical segments. As a result, performance of a logical array may degrade because of excessive accesses to a hot spot although accesses to the overall logical array are not excessive.

SUMMARY OF THE INVENTION

From the foregoing discussion, there is a need for an apparatus, system, and method that relocates hot spots. Beneficially, such an apparatus, system, and method would reduce accesses to the hot spots in logical arrays.

The present invention has been developed in response to the present state of the art, and in particular, in response to the problems and needs in the art that have not yet been fully solved by currently available storage management apparatus and methods. Accordingly, the present invention has been developed to provide an apparatus, system, and method for relocating hot spots that overcome many or all of the above-discussed shortcomings in the art.

The apparatus to relocate hot spots is provided with a plurality of modules configured to functionally execute the steps of organizing a plurality of logical arrays, identifying a hot spot on a first logical array, selecting a first and second logical segment for migration from the plurality of logical segments in response to a migration policy and dynamically migrating the first logical segment to the second logical segment. These modules in the described embodiments include an organization module, an identification module and a migration module.

The organization module comprises computer executable code stored on a tangible storage device, executed by a processor, and configured to organize a plurality of logical arrays. Each logical array comprises of a plurality of logical segments from a plurality of storage devices and is configured to store data. The identification module comprises computer executable code stored on the tangible storage device, executed by the processor, and configured to identify a hot spot on a first logical array if accesses to the first logical array exceed an access threshold.

The migration module comprises computer executable code stored on the tangible storage device, executed by the processor, and configured to dynamically migrate a first logical segment from the first logical array to a second logical segment of a second logical array, wherein the migration is transparent to a host and data of the first logical segment is continuously available to the host. In one embodiment, accesses to the first logical array exceed the access threshold when a wait queue count exceeds the access threshold.

Alternately, accesses to the first logical array exceed the access threshold when a number of accesses over an access time interval exceeds the access threshold. In another embodiment, the migration module is further configured to select the first logical segment for migration from the plurality of logical segments in response to a migration policy. The migration module selects the first logical segment if the accesses to the first logical segment exceed a use threshold.

The invention enables migration of logical segments from an overdriven rank to an under or non utilized rank either in the same extent pools or across extent pools. The volume relationship with the host remains unchanged, however the physical location of the logical segments is migrated to improve performance and utilize the storage hierarchy better.

A system of the present invention is also presented to relocate hot spots. The system includes a host, a plurality of logical arrays, and a controller. Each logical array comprises a plurality of logical segments from a plurality of storage devices. In addition, each logical array is configured to store data. The controller includes a processor executing computer readable code stored on a tangible storage device and comprising an organization module, an identification module and a migration module.

The organization module comprises computer executable code stored on a tangible storage device, executed by a processor, and configured to organize a plurality of logical arrays. Each logical array comprises of a plurality of logical segments from a plurality of storage devices and configured to store data. The identification module comprises computer executable code stored on the tangible storage device, executed by the processor, and configured to identify a hot spot on a first logical array if accesses to the first logical array exceed an access threshold.

The migration module comprises computer executable code stored on the tangible storage device, executed by the processor, and configured to dynamically migrate a first logical segment from the first logical array to a second logical segment of a second logical array, wherein the migration is transparent to a host and data of the first logical segment is continuously available to the host.

A method of the present invention is also presented for relocating hot spots. The method in the disclosed embodiments substantially includes the steps to carry out the functions presented above with respect to the operation of the described apparatus and system. In one embodiment, the method includes organizing a plurality of logical arrays, identifying a hot spot on a first logical array, selecting a first and second logical segment for migration from the plurality of logical segments in response to a migration policy and dynamically migrating the first logical segment to the second logical segment.

An organization module is configured to organize a plurality of logical arrays. Each logical array comprises a plurality of logical segments from a plurality of storage devices and configured to store data. An identification module identifies a hot spot on a first logical array if accesses to the first logical array exceed an access threshold. A migration module dynamically migrates a first logical segment from the first logical array to a second logical segment of a second logical array, wherein the migration is transparent to a host and data of the first logical segment is continuously available to the host.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention identifies a logical array with excessive accesses, referred to herein as a hot spot, and relocates a logical segment of the logical array. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
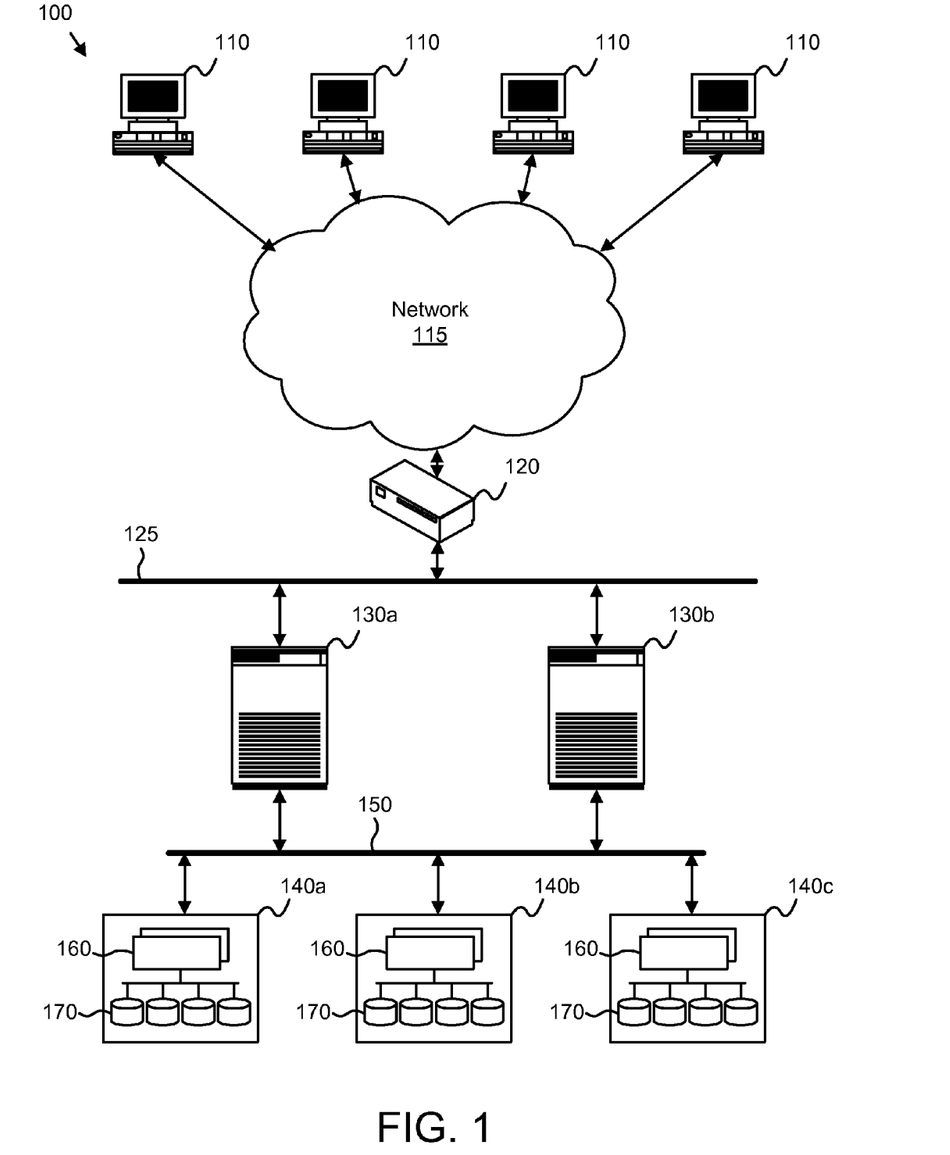
FIG. 1 is a schematic block diagram illustrating one embodiment of an enterprise data processing system in accordance with the present invention.

FIG. 1 is a schematic block diagram illustrating one embodiment of an enterprise data processing system (DPS) 100 in accordance with the present invention. The DPS 100 includes one or more host computers 110, a network 115, a router 120, an internal network 125, one or more servers 130, a storage communications channel 150, and one or more storage subsystems 140.

As used herein, the host computers 110 are referred to as hosts 110. The servers 130 may be configured as mainframe computers, blade centers comprising multiple blade servers, and the like. Although for simplicity four hosts 110, one network 115, one router 120, one internal network 125, two servers 130, one storage communications channel 150, and three storage subsystems 140 are shown, any number of hosts 110, networks 115, routers 120, internal networks 125, servers 130, storage communications channels 150 and storage subsystems 140 may be employed. One of skill in the art will also readily recognize that the DPS 100 could include other data processing devices such as bridges, scanners, printers, and the like.

Each storage subsystem 140 includes one or more storage controllers 160 and one or more storage devices 170. The storage devices 170 may be hard disk drives, optical storage devices, magnetic tape drives, micromechanical storage devices, holographic storage devices, and semiconductor storage devices.

In one embodiment, the DPS 100 provides data storage and data manipulation services for the hosts 110. For example, a host 110 may access data stored on a storage device 170 of a storage subsystem 140 by communicating a request through the network 115, the router 120, the internal network 125, a server 130, and the storage communications channel 150 to a storage controller 160 for the storage device 170. The storage controller 160 may retrieve the data from the storage device 170 and communicate the data to the host 110. In one embodiment, the server 130 may execute a database application used by the host 110 to access the data.

One or more hosts 110 may access a storage device 170 excessively. As a result, access to the data on the storage device 170 may degrade. The present invention mitigates excessive accesses to a storage device 170 as will be described hereafter.

Figure 2:
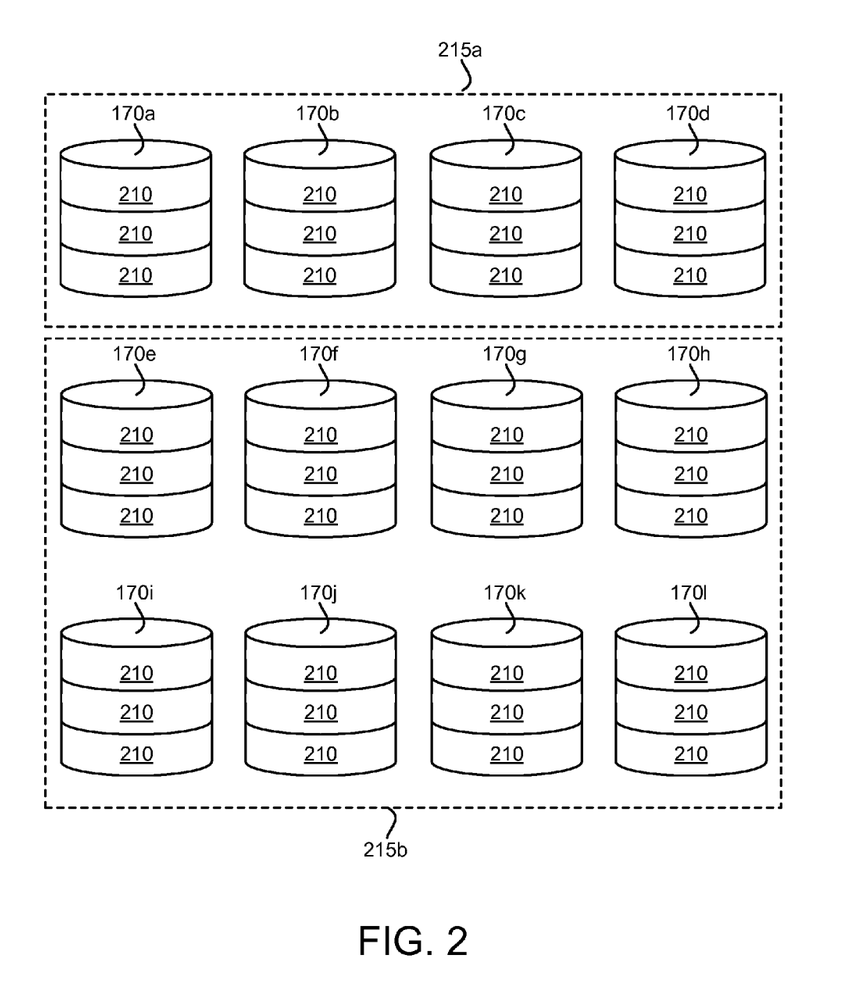
FIG. 2 is a schematic block diagram illustrating one embodiment of logical arrays of the present invention.

FIG. 2 is a schematic block diagram illustrating one embodiment of logical arrays 215 of the present invention. The logical arrays 215 include storage devices 170. The storage devices 170 may be the storages devices 170 of FIG. 1. The description of the logical arrays 215 refers to elements of FIG. 1, like numbers referring to like elements.

Each storage device 170 is divided into one or more physical segments 210. Data on the storage devices 170 is accessible through various control input/output commands, particularly read and write commands from one or more hosts 110.

Each logical array 215 comprises multiple storage devices 170. The management of such resources becomes very important because the ineffective utilization of the capabilities in the logical array 215 can affect overall DPS performance significantly. A system administrator will determine certain characteristics of the data sets to be stored. For example these characteristics may include the data set size, and volume names and, in some systems, the relationship between a logical array 215 and a particular host 110. The administrator may direct that the logical arrays 215 be organized to support the data characteristics. For example, a logical array 215 may be organized with one thousand gigabytes (1,000 GB) of storage to accommodate a transaction database.

Unfortunately, it may only become apparent after the DPS 100 is in use if there are problems with the organization of the logical arrays 215. For example, if a first storage device 170*a* of a logical array 215 is accessed excessively, the hosts 110 may be unable to access data on the first storage device 170*a* and/or the logical array 215 in a timely manner.

Figure 3:
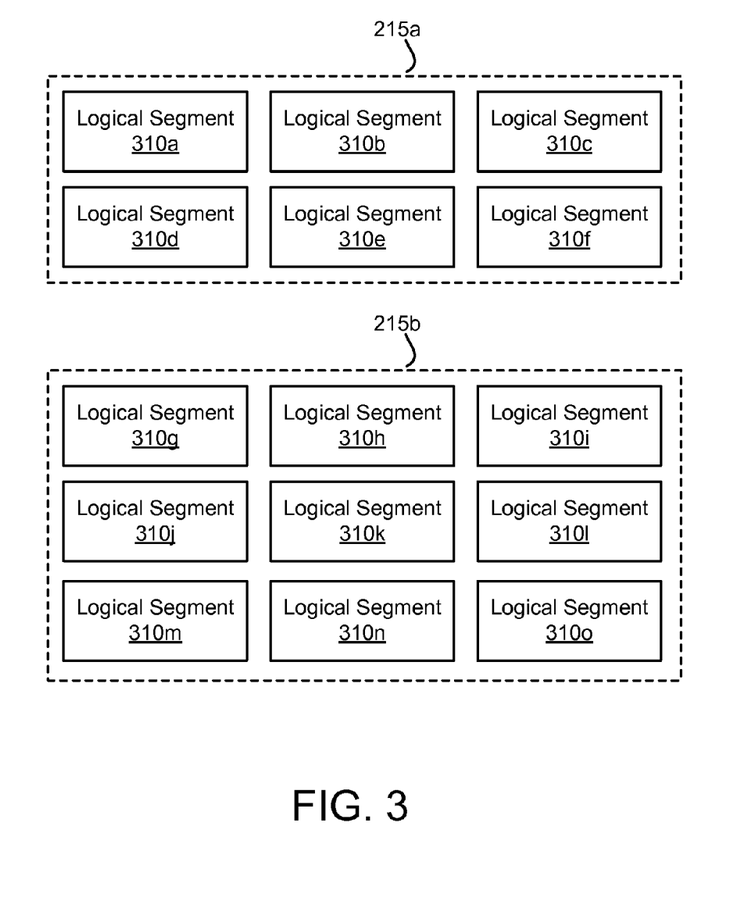
FIG. 3 is a schematic block diagram illustrating one alternate embodiment of logical arrays of the present invention.

FIG. 3 is a schematic block diagram illustrating one alternate embodiment of the logical arrays 215 of the present invention. The logical arrays 215 of FIG. 2 are shown comprised of a plurality of logical segments 310. The description of the logical arrays 215 refers to elements of FIGS. 1-2, like numbers referring to like elements. Each logical segment 310 may comprise one or more physical segments 210. For example, each logical segment 310 may comprise a one megabyte (1 MB) physical segment 210. The logical segments 310 are not restricted to any storage device 170. Thus the logical segments 310 of the first logical array 215*a* may include physical segments 210 from any storage device 170.

Some logical segments 310 may be accessed more than other logical segments 310. For example, a first logical segment 310*a* may store an often accessed portion of a database. Multiple hosts 110 may access the first logical segment 310*a*, resulting in degraded performance for all accesses to the logical array 215. The present invention migrates logical segments 310 to reduce hot spots in the logical array 215. For example, logical segments 310 from an overdriven logical array 215 may be migrated to an under-utilized logical array 215. The volume relationship with the host 110 remains unchanged, although the location of the logical segments 310 is migrated to improve performance and better utilize the storage hierarchy as will be described hereafter.

Figure 4:
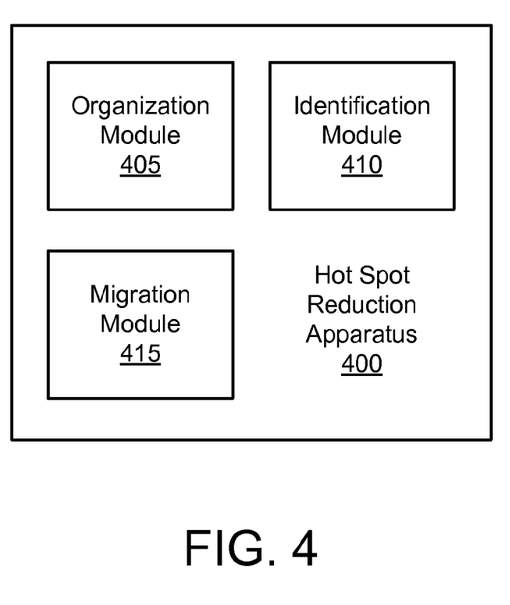
FIG. 4 is a schematic block diagram illustrating one embodiment of a hot spot reduction apparatus of the present invention.

FIG. 4 is a schematic block diagram illustrating one embodiment of a hot spot reduction apparatus 400 of the present invention. The description of the hot spot reduction apparatus 400 refers to elements of FIGS. 1-3, like numbers referring to like elements. The hot spot reduction apparatus 400 includes an organization module 405, an identification module 410, and a migration module 415.

The organization module 405 may comprise computer executable code stored on a tangible storage device such as a memory of a server 130. The code may be executed by a processor such as a server processor. Alternatively the code may be stored in memory of a storage controller 160 and executed by a storage controller processor.

The organization module 405 organizes a plurality of logical arrays 215. Each logical array 215 comprises of a plurality of logical segments 310 from a plurality of storage devices 170 and is configured to store data.

The identification module 410 comprises computer executable code stored on the tangible storage device such as a memory of a server 130. The code may be executed by server processor. Alternatively the code may be stored in memory of a storage controller 160 and executed by a storage controller processor. The identification module 410 identifies a hot spot on a first logical array 215*a* if accesses to the first logical array 215*a* exceed an access threshold as will be described hereafter.

The migration module 415 includes computer executable code stored on the tangible storage device and executed by the processor. In one embodiment, the code is stored on a server memory and executed by a server processor. Alternatively, the code is stored on a storage controller memory and executed by a storage controller processor. The migration module 415 dynamically migrates a first logical segment 310*a* from the first logical array 215*a* to a second logical segment 310 of a second logical array 215*b*. The migration is transparent to a host 110. Data of the first logical segment 210 is continuously available to the host 110.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
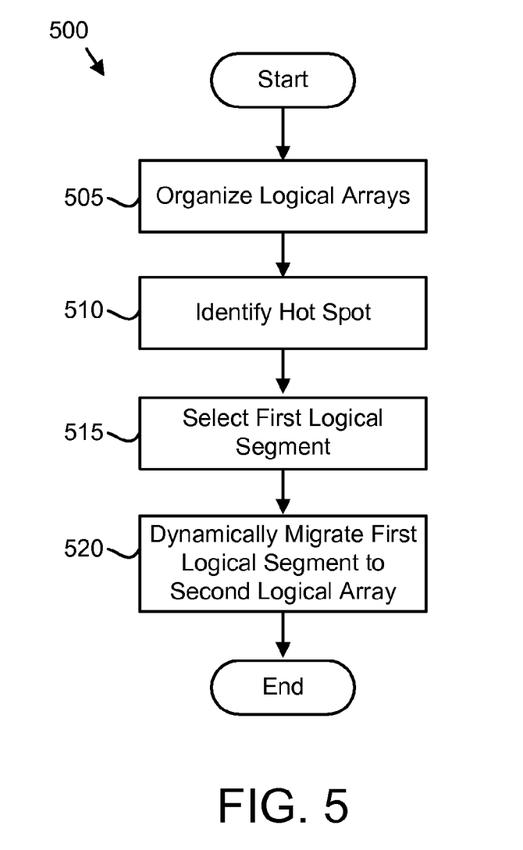
FIG. 5 is a schematic flow chart diagram illustrating one embodiment of a hot spot reduction method of the present invention.

FIG. 5 is a schematic flow chart diagram illustrating one embodiment of a hot spot reduction method 500 of the present invention. The method 500 substantially includes the steps to carry out the functions presented above with respect to the operation of the described apparatus and system of FIGS. 1-4.

The description of the method 500 refers to elements of FIGS. 1-4, like numbers referring to like elements.

In one embodiment, the method 500 is implemented with a computer program product comprising a tangible computer readable medium having a computer readable program. The computer readable program may be executed by a processor of the server 130 and/or storage controller 160, wherein the program in combination with the processor is capable of performing the method 500.

The hot spot reduction method 500 begins and the organization module 405 organizes 505 logical arrays 215. For example, the organization module 405 may organize a plurality of physical segments 210 into one or more arrays 215 as shown in FIG. 2. In one embodiment, the organization module 405 organizes one or more logical segments 310 into the logical arrays 215. Each logical segment 310 may comprise one or more physical segments 210. For example, each logical segment 310 may comprise a one megabyte (1 MB) physical segment 210.

The identification module 410 identifies 510 a hot spot on a first logical array 215a if accesses to the first logical array 215a exceed an access threshold. In one embodiment, the logical array 215 includes a wait queue. The wait queue may store read and write commands before each command is completed. For example, the wait queue may store a write command until the write commands data is written to a storage device 170. The identification module 410 may identify 510 the hot spot on the first logical array 215a when a wait queue count exceeds a specified access threshold. In one embodiment, the specified access threshold is sixteen (16) commands in the wait queue.

In an alternate embodiment, accesses to the first logical array 215a exceed the access threshold when a number of accesses over an access time interval exceed the access threshold. For example, the identification module 410 may record a time of each logical array access and calculate the number of accesses for one or more time intervals. The identification module 410 may identify 510 the hot spot if accesses to the logical array 215 exceed an access threshold such as two hundred and fifty accesses/minute (250/min).

Alternatively, the identification module 410 may track a quantity of data transferred by the first logical array 215s over the one or more time intervals. For example, the identification module 410 may record a number of megabytes of data transferred over a one minute interval. The identification module 410 may identify 510 the hot spot if the data transferred by the logical array 215 exceed an access threshold such as fifty megabytes/minute (50 MB/min).

In one embodiment, the logical segments 310 in each logical array 215 may have a current usage corresponding to accesses to each logical segment 310. The current usage information may comprise accesses to the logical segment 310, data transferred by the logical segment 310, and the like.

The identification module 410 may identify 510 the hot spot on the first logical array 215a if a number of logical segments 310 with a current usage greater than a use threshold exceeds an access threshold. For example, the access threshold may specify that no more than five (5) logical segments 310 may have a current usage that exceeds the use threshold. The use threshold may specify that the logical segment 310 transfer no more than five hundred kilobytes/second (500 kB/s). Alternatively, the use threshold may specify that the logical segment 310 have no more than twenty-five accesses per second (25/s). If more than five logical segments 310 exceed the use threshold, then the identification module 410 may identify 510 the first logical array 215a as a hot spot.

In one embodiment, the migration module 415 selects 515 a first logical segment 310a for migration in response to a migration policy. The migration module 415 may select 515 the first logical segment 310a if the accesses to the first logical segment 310a exceed the use threshold. In one embodiment, the logical segment usage is monitored and if the logical segment usage exceeds the use threshold, then the logical segment 310 becomes a candidate for migration to a second logical array 215b.

In one embodiment, the migration policy specifies selecting a first logical segment 310a with the highest current usage. For example, the first logical segment 310a may be selected for migration to a higher speed/lower usage logical array 215 if the logical segment current usage of one megabyte per minute (1 MB/min) is the highest current usage.

The migration module 415 dynamically migrates 520 the data of the first logical segment 310a from the first logical array 215a to a second logical segment 310 of a second logical array 215b. The migration is transparent to the hosts 110 and data of the first logical segment 210 is continuously available to the host 110. For example, while the first logical segment 310a is migrated from the first logical array 215a to an under-utilized second logical array 215b, the data of the first logical segment 310a remains available to the hosts 110.

The migration module 415 may migrate 520 the first logical segment 310a using a Flash Copy algorithm. The Flash Copy algorithm may support instantaneous access to the data on the new rank while it is being copied from the old set of ranks.

In one embodiment, the Flash Copy algorithm makes a second image of data available. The Flash Copy algorithm is sometimes known in other system contexts as Point-In-Time copy, or T0-copy. The second image's contents are initially identical to that of the first. The second image is made available 'instantly.' In practical terms this means that the second image is made available in much less time than would be required to create a true, separate, physical copy, and that this means that it can be established without unacceptable disruption to a using application.

The volume relationship with the host 110 remains unchanged. However, the physical location of the first logical segment 310a may be migrated to improve performance. For example, the first logical segment 310a may be migrated from a first storage device 170a to a fifth storage device 170e in the second logical array 215b. By migrating the logical segments 310, the present invention improves load balancing, capacity balancing, and performance.

Figure 6:
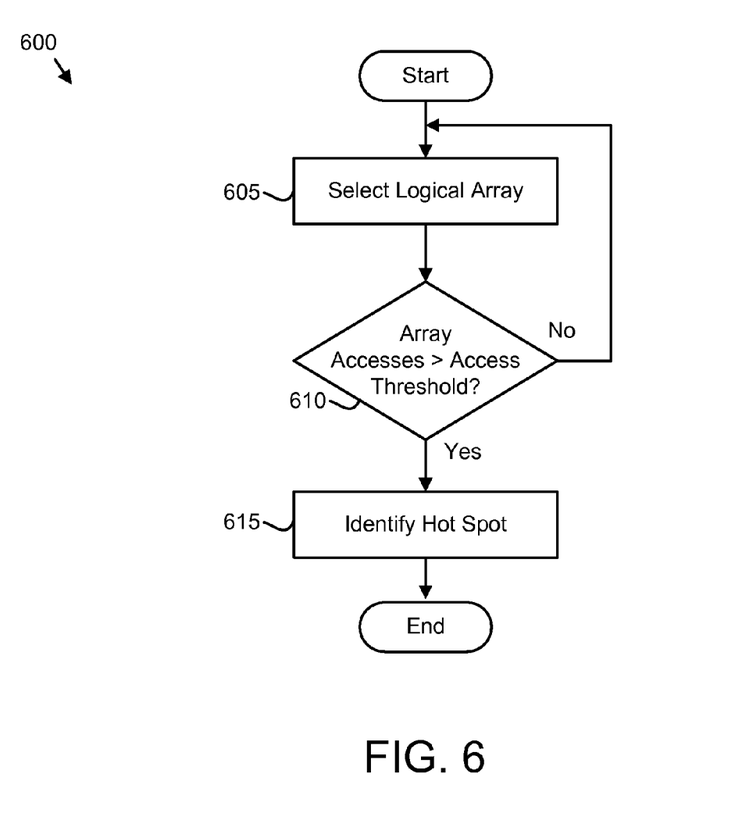
FIG. 6 is a schematic flow chart diagram illustrating one embodiment of a hot spot identification method of the present invention.

FIG. 6 is a schematic flow chart diagram illustrating one embodiment of a hot spot identification method 600 of the present invention. The method 600 substantially includes the steps to carry out the functions presented above with respect to the operation of the described apparatus and system of FIGS. 1-4, and may embody step 510 of FIG. 5. The description of the method 600 refers to elements of FIGS. 1-5, like numbers referring to like elements. In one embodiment, the method 600 is implemented with a computer program product comprising a computer readable medium having a computer readable program. The computer readable program may be integrated into a processor of the server 130 and/or storage controller 160, wherein the program in combination with the processor is capable of performing the method 600.

The method 600 begins and the organization module 405 selects 605 a logical array 215. In one embodiment, the organization module 405 selects 605 each logical array 215 in turn so that all logical arrays 215 are eventually selected. Alternatively, the organization module 405 may select 605 a logical array 215 that with a highest number of accesses.

The identification module 410 determines 610 if logical array accesses exceed the access threshold. For example, an initial segment count, maximum segments allocated, current segments allocated, current free segments, current tracks allocated, and current wait queue count may be recorded over a specified time interval. The initial segment count, maximum segments allocated, current segments allocated, current free segments, current tracks allocated, and current wait queue count may be tabulated to determine the logical array accesses of the logical array 215.

If the array accesses exceed the access threshold, the identification module 410 identifies 615 the logical array as a hot spot and the method 600 ends. The access threshold may be defined as the maximum number of times the logical array 215 is accessed per time interval such as two hundred times per minute (200/min). If the array accesses do not exceed the access threshold, the organization module 405 may select 605 another storage pool 220.

Figure 7:
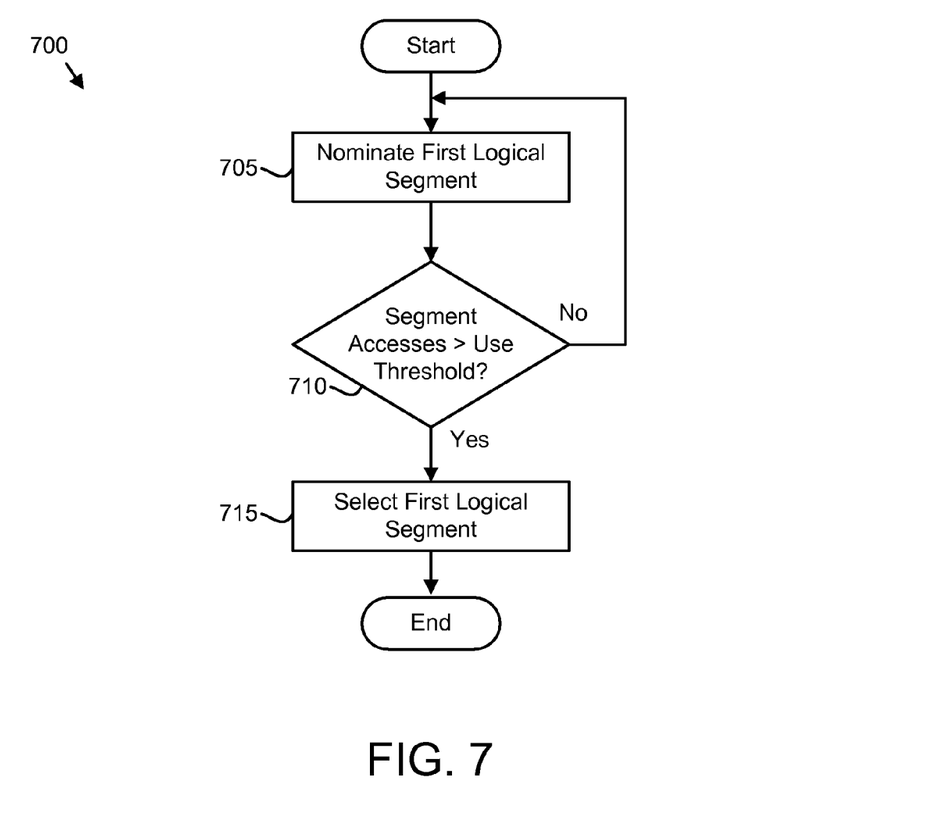
FIG. 7 is a schematic flowchart diagram illustrating one embodiment of a logical segment identification method of the present invention.

FIG. 7 is a schematic flowchart diagram illustrating one embodiment of a logical segment identification method 700 of the present invention. The method 700 may embody step 515 of FIG. 5. The description of the method 700 refers to elements of FIGS. 1-4, like numbers referring to like elements. In one embodiment, the method 700 is implemented with a computer program product comprising a computer readable medium having a computer readable program. The computer readable program may be integrated into a processor of the server 130 and/or storage controller 160, wherein the program in combination with the processor is capable of performing the method 700.

The hot spot identification method 700 begins and the organization module 405 nominates 705 a first logical segment 310a. The organization module 405 may nominate 705 the logical segment 310 with the highest current usage. In one embodiment, the organization module 405 nominates 705 the logical segment 310 with the highest latency. Alternatively, the organization module 405 may nominate the logical segment 310 with the greatest number of errors such as correctable soft errors.

The identification module determines 710 if segment accesses are greater than the use threshold. The use threshold may be defined as the maximum number of times the logical segment 310 may be accessed effectively over a specified time interval. If the segment accesses are greater than the use threshold then the logical segment 310 is selected 715 for migration and the method 600 ends. For example, the first logical segment 310a may be selected 715 for migration to the second logical array 215b if the logical segment current usage of one megabyte per minute (1 MB/min) exceeds the exemplary use threshold of five hundred kilobytes/min (500 kB/min). If the segment accesses are not greater than the use threshold, the organization module 405 may nominate 705 another logical segment 310.

The present invention identifies a hot spot logical array 215 and relocates a logical segment 310 of the logical array 215. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a storage device storing a computer readable program, wherein the computer readable program when executed on a computer causes the computer to:
    organize a plurality of logical arrays, each logical array comprising a plurality of logical segments from a plurality of storage devices and configured to store data;
    iteratively identify a hot spot on any logical array each time a wait queue count for the identified logical array exceeds an access threshold, wherein the wait queue count is a number of read and write commands for the identified logical array stored in a single wait queue of all pending accesses to the identified logical array and the access threshold is a specified number of read and write commands in the wait queue; and
    dynamically migrate a first logical segment from the identified logical array to a second logical segment of a second logical array in response to identifying the hot spot, wherein the migration is transparent to a host and data of the first logical segment is continuously available to the host.

2. The computer program product of claim 1, further comprising identifying the hot spot if the wait queue count exceeds the access threshold and a number of accesses over an access time interval exceeds a second access threshold.

3. The computer program product of claim 1, further comprising identifying the hot spot if the wait queue count exceeds the access threshold and a quantity of data transferred over an access time interval exceeds a second access threshold.

4. The computer program product of claim 1, wherein the computer readable program further causes the computer to select the first logical segment for migration from the plurality of logical segments in response to a migration policy.

5. The computer program product of claim 4, wherein the computer readable program further causes the computer to select the first logical segment if the accesses to the first logical segment exceed a use threshold.

6. The computer program product of claim 1, wherein the first logical segment comprises at least a portion of a logical volume.

7. The computer program product of claim 1, wherein the first logical segment comprises at least a portion of the identified logical array.

8. The computer program product of claim 1, wherein the plurality of logical segments are organized as at least one pool.

9. The computer program product of claim 1, wherein the computer readable program further causes the computer to select the second logical array in response to a migration policy.

10. The computer program product of claim 1, wherein the first logical segment is dynamically migrated by making a second image of a first image of the first logical segment using a flash copy algorithm and making the second image available prior to copying the first logical segment.

11. An apparatus to relocate hot spots, the apparatus comprising:
    a tangible storage device storing computer readable code;
    a processor executing the computer readable code, the computer readable code comprising:
    an organization module organizing a plurality of logical arrays, each logical array comprising a plurality of logical segments from a plurality of storage devices and configured to store data;
    an identification module iteratively identifying a hot spot on any logical array each time a wait queue count for the identified logical array exceeds an access threshold, wherein the wait queue count is a number of read and write commands for the identified logical array stored in a single wait queue of all pending accesses to the identified logical array and the access threshold is a specified number of read and write commands in the wait; and a migration module dynamically migrating a first logical segment from the identified logical array to a second logical segment of a second logical array in response to identifying the hot spot, wherein the migration is transparent to a host and data of the first logical segment is continuously available to the host.

12. The apparatus of claim 11, the identification module identifying the hot spot if the wait queue count exceeds the access threshold and a number of accesses over an access time interval exceed a second access threshold.

13. The apparatus of claim 11, the migration module further selecting the first logical segment for migration from the plurality of logical segments in response to a migration policy.

14. The apparatus of claim 13, wherein the migration module selects the first logical segment if the accesses to the first logical segment exceed a use threshold.

15. The apparatus of claim 11, wherein the migration module migrates the first logical segment by making a second image of a first image of the first logical segment using a flash copy algorithm and making the second image available prior to copying the first logical segment.

16. A system to relocate hot spots, the system comprising:
a host;
a plurality of logical arrays, each logical array comprising a plurality of logical segments from a plurality of storage devices and configured to store data;
a controller with a processor executing computer readable code stored on a tangible storage device and comprising:
an organization module organizing the plurality of logical arrays;
an identification module iteratively identifying a hot spot on any logical array each time a wait queue count for the identified logical array exceeds an access threshold, wherein the wait queue count is a number of read and write commands for the identified logical array stored in a single wait queue of all pending accesses to the identified logical array and the access threshold is a specified number of read and write commands in the wait queue; and
a migration module dynamically migrating a first logical segment from the identified logical array to a second logical segment of a second logical array in response to identifying the hot spot, wherein the migration is transparent to the host and data of the first logical segment is continuously available to the host.

17. The system of claim 16, the identification module identifying the hot spot if the wait queue count exceeds the access threshold and a number of accesses over an access time interval exceed a second access threshold.

18. The system of claim 16, wherein each storage device is a hard disk drive and each logical segment is storage capacity in the range of one to ten gigabytes.

19. A method for deploying computer infrastructure, comprising integrating computer readable program into a computing system, wherein the program executed by the computing system performs the following:
organizing a plurality of logical arrays, each logical array comprising a plurality of logical segments from a plurality of storage devices and configured to store data;
iteratively identifying a hot spot on any logical array each time a wait queue count for the identified logical array exceeds an access threshold, wherein the wait queue count is a number of read and write commands for the identified logical array stored in a single wait queue of all pending accesses to the identified logical array and the access threshold is a specified number of read and write commands in the wait queue;
selecting a first logical segment for migration from the plurality of logical segments in response to a migration policy;
selecting a second logical segment of a second logical array in response to a migration policy; and
dynamically migrating the first logical segment from the identified logical array to the second logical segment in response to identifying the hot spot, wherein the migration is transparent to a host and data of the first logical segment is continuously available to the host by making a second image of a first image of the first logical segment using a flash copy algorithm and making the second image available prior to copying the first logical segment.

20. The system of claim 16, wherein the migration module dynamically migrates the first logical segment by making a second image of a first image of the first logical segment using a flash copy algorithm and making the second image available prior to copying the first logical segment.

* * * * *